United States Patent
Hamamoto et al.

(10) Patent No.: US 12,556,909 B2
(45) Date of Patent: Feb. 17, 2026

(54) POWER STORAGE PACK, MOBILE TERMINAL DEVICE, AND WIRELESS COMMUNICATION PROGRAM

(71) Applicant: Panasonic Intellectual Property Management Co., Ltd., Osaka (JP)

(72) Inventors: Katsuaki Hamamoto, Gifu (JP); Naohisa Morimoto, Osaka (JP); Koki Yamanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 113 days.

(21) Appl. No.: 18/683,290

(22) PCT Filed: Jul. 20, 2022

(86) PCT No.: PCT/JP2022/028249
§ 371 (c)(1),
(2) Date: Feb. 13, 2024

(87) PCT Pub. No.: WO2023/021912
PCT Pub. Date: Feb. 23, 2023

(65) Prior Publication Data
US 2024/0349043 A1    Oct. 17, 2024

(30) Foreign Application Priority Data
Aug. 17, 2021  (JP) ................................ 2021-132802

(51) Int. Cl.
*H04L 29/06*    (2006.01)
*G06F 21/44*    (2013.01)
(Continued)

(52) U.S. Cl.
CPC .......... *H04W 12/04* (2013.01); *G06F 21/445* (2013.01); *G06F 21/606* (2013.01); *H04L 9/08* (2013.01)

(58) Field of Classification Search
None
See application file for complete search history.

(56) References Cited

U.S. PATENT DOCUMENTS

| 2014/0281547 A1* | 9/2014 | Modzelewski | ......... H04L 63/18 713/171 |
| 2016/0360347 A1 | 12/2016 | Kuroda | |
| 2019/0279285 A1 | 9/2019 | Lin et al. | |

FOREIGN PATENT DOCUMENTS

| CN | 211404583 | 9/2020 |
| EP | 3032443 A1 | 6/2016 |

(Continued)

OTHER PUBLICATIONS

International Search Report of PCT application No. PCT/JP2022/028249 dated Oct. 4, 2022.
(Continued)

*Primary Examiner* — Andrew J Steinle
(74) *Attorney, Agent, or Firm* — CANTOR COLBURN LLP

(57) ABSTRACT

In a power storage pack, a power storage unit supplies electric power to an electric mobile body. A wireless communication unit performs short-range wireless communication. A notification unit presents, to a user of a mobile terminal device, a tentative notification of a verification code that is to be used in the process of exchanging an encryption key that is to be used for the short-range wireless communication with the mobile terminal device. The notification unit may include a remaining capacity display for the power storage unit.

3 Claims, 5 Drawing Sheets

(51) Int. Cl.
*G06F 21/60* (2013.01)
*H04L 9/08* (2006.01)
*H04W 12/04* (2021.01)

(56) References Cited

FOREIGN PATENT DOCUMENTS

| | | | |
|---|---|---|---|
| JP | 2016-519458 | | 6/2016 |
| JP | 2019-164770 | | 9/2019 |
| JP | 2021-044203 | | 3/2021 |
| JP | 2021044203 A | * | 3/2021 |
| WO | 2014/165172 | | 10/2014 |

OTHER PUBLICATIONS

The EPC Office Action dated Nov. 18, 2024 for the related European Patent Application No. 22858234.2.

* cited by examiner

POWER STORAGE PACK, MOBILE TERMINAL DEVICE, AND WIRELESS COMMUNICATION PROGRAM

CROSS-REFERENCE TO RELATED APPLICATIONS

This application is a U.S. national stage application of the PCT International Application No. PCT/JP2022/028249 filed on Jul. 20, 2022, which claims the benefit of foreign priority of Japanese patent application No. 2021-132802 filed on Aug. 17, 2021, the contents all of which are incorporated herein by reference.

TECHNICAL FIELD

The present disclosure relates to a power storage pack that can be attached to and detached from an electric mobile body, a mobile terminal device, and a wireless communication program.

BACKGROUND ART

In recent years, electric assisted bicycles have become popular. Detachable, portable battery packs are used in the electric assisted bicycles. In order to remove terminals for communication lines from connectors of the battery packs, a system has been developed in which a battery pack and an electric assisted bicycle include wireless communication functions and control signals are transmitted wirelessly. Furthermore, a system has been developed in which a battery pack including a wireless communication function and a mobile terminal device such as a smartphone as a monitoring device are connected wirelessly so that the battery pack is monitored and controlled from the external mobile terminal device.

It is conceivable that in order to improve the security of a pairing process that is performed to connect the mobile terminal device and the battery pack via short-range wireless communication, a verification code will be displayed on the battery pack so that when the verification code is input to the mobile terminal device, the devices will be verified. However, providing the battery pack with a display capable of displaying a verification code with multiple digits leads to an increase in cost.

It is conceivable that the verification code in the form of a barcode sticker, a QR code (registered trademark) sticker, or another sticker will be attached to the battery pack (for example, refer to Patent Literature (PTL) 1).

CITATION LIST

Patent Literature

PTL 1: Unexamined Japanese Patent Publication No. 2019-164770

SUMMARY OF INVENTION

When a sticker on which a barcode, a QR code, or the like is printed is attached to the battery pack, the verification code shown as the barcode, the QR code, or the like has a fixed value during operation unless the sticker is replaced with a new one. In this case, the level of security is lower than that in operation in which a new verification code is generated every time a verification code is issued. A state where the sticker on which the barcode, the QR code, or the like is printed is attached to the battery pack refers to a state where information of the verification code is constantly exposed to the outside.

The present disclosure is conceived in view of this situation and has an object to provide a technique to improve the security of a pairing process for a power storage pack and a mobile terminal device.

In order to solve the above problem, a power storage pack according to one aspect of the present disclosure includes: a power storage unit configured to supply electric power to an electric mobile body; a wireless communication unit configured to perform short-range wireless communication; and a notification unit that presents, to a user of a mobile terminal device, a tentative notification of a verification code that is to be used in a process of exchanging an encryption that is to be used for the short-range wireless communication with the mobile terminal device.

Note that an arbitrary combination of the structural elements described above and those obtained by converting the expressions described in the present disclosure into devices, systems, methods, computer programs, and recording media having the computer programs recorded thereon, for example, are also effective as embodiments of the present disclosure.

With the present disclosure, the security of a pairing process for a power storage pack and a mobile terminal device can be improved.

DESCRIPTION OF EMBODIMENTS

Figure 1:
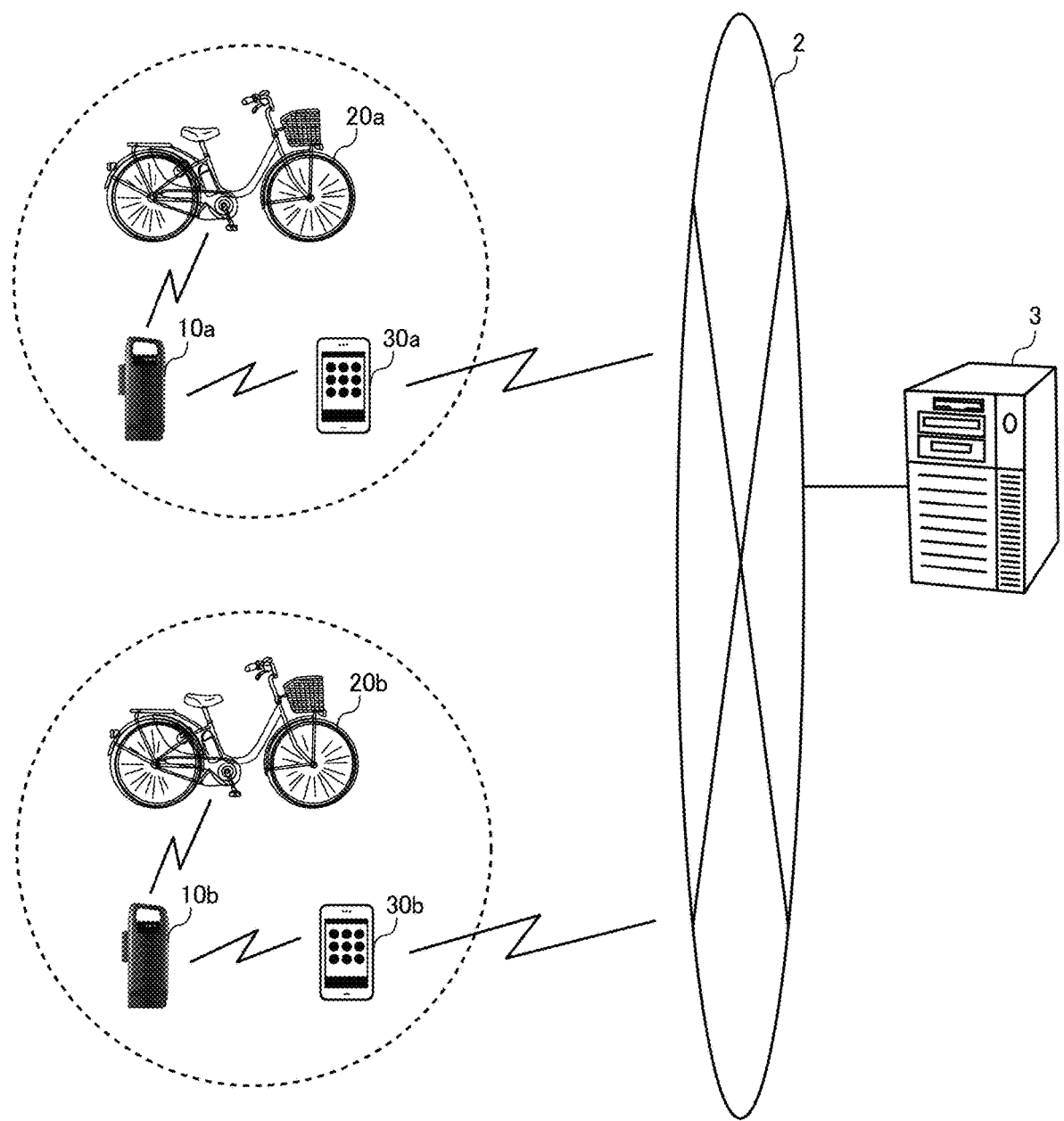
FIG. 1 is a diagram illustrating the overall configuration of a management service for a battery pack according to an exemplary embodiment.

FIG. 1 is a diagram illustrating the overall configuration of a management service for battery pack 10 according to an exemplary embodiment. Battery pack 10, which is a detachable, portable, replaceable battery pack, can be attached to a mounting slot of vehicle 20 or a charger (not illustrated in the drawings). Hereinafter, the exemplary embodiment assumes that vehicle 20 is an electric assisted bicycle.

Replaceable battery pack 10 is frequently attached to or detached from the mounting slot of vehicle 20 or the charger, and therefore a connector part of battery pack 10 is prone to wear and tear. Thus, in the present exemplary embodiment, battery pack 10 is provided with a wireless communication function to wirelessly transmit control signals. This allows for removal of a terminal for communication lines from a connector of battery pack 10, leaving only a terminal for power lines.

Short-range wireless communication is used for the wireless communication between vehicle 20 and battery pack 10. As the short-range wireless communication, BLUETOOTH wireless technology, Wi-Fi (registered trademark), infrared communication, or the like can be used. Hereinafter, the present exemplary embodiment assumes that Bluetooth Low Energy (BLE) is used as the short-range wireless communication.

BLE, which is one extended standard of Bluetooth, is a short-range wireless communication standard for low power consumption using the 2.4 GHz band. BLE focuses on low power consumption allowing a device to operate for several years on a single button cell, meaning that BLE is suitable for battery powered devices and can minimize the impact on the remaining capacity of battery pack 10. Furthermore, many modules for BLE communication are available in the market and thus are accessible at low cost.

Moreover, BLE is highly compatible with a smartphone and can provide various services in conjunction with the smartphone. In the present exemplary embodiment, battery pack 10 and mobile terminal device 30 owned by a user are connected via the short-range wireless communication. A smartphone, a smartwatch, a tablet, a small laptop personal computer (PC), a portable game console, or the like can be used as mobile terminal device 30. Hereinafter, the present exemplary embodiment assumes that mobile terminal device 30 is a smartphone and that battery pack 10 and the smartphone are connected via BLE.

Battery pack management system 3 is a system that collectively manages the states of a plurality of battery packs 10. Battery pack management system 3 is constructed on a battery manufacturer cloud server installed in a battery manufacturer facility or a data center or is constructed on a cloud server that is used in accordance with a cloud service contract, for example. Note that instead of a battery manufacturer, an operation entity that provides an electric assisted bicycle rental service, an electric assisted bicycle sharing service, or the like may construct battery pack management system 3.

Battery pack management system 3 and mobile terminal device 30 are connected to network 2. Network 2 is a generic term of communication paths such as the Internet, a dedicated line, and a virtual private network (VPN); the communication medium, the protocol, etc., of network 2 are not limited. As the communication medium, a mobile network (cellular network), a wireless local area network (LAN), a wired LAN, a fiber optic network, an asymmetric digital subscriber line (ADSL) network, or a cable television (CATV) network can be used, for example. As the communication protocol, transmission control protocol (TCP)/Internet protocol (IP), user datagram protocol (UDP)/IP, or Ethernet (registered trademark) can be used, for example.

In the present exemplary embodiment, mobile terminal device 30 is connected to network 2 via a base station of a 4G/5G mobile network or a Wi-Fi access point. Battery pack management system 3 is connected to network 2 via a router. Battery pack 10 can be indirectly connected to a device on the Internet when battery pack 10 is connected to mobile terminal device 30 via short-range wireless communication.

Battery pack management system 3 manages, as basic information, the identification information (pack ID), the manufacturing date, the owner information (name, address, phone number, e-mail address, etc.), and the warranty coverage of each battery pack 10. There are cases where the owner and the manager of battery pack 10 that is used in an electric assisted bicycle rental service, an electric assisted bicycle sharing service, or the like are different. In these cases, battery pack management system 3 manages manager information as well. Furthermore, battery pack management system 3 can also manage user information of a user who has rented an electric assisted bicycle and is currently using the electric assisted bicycle.

Battery pack management system 3 can obtain, via mobile terminal device 30 of each user, status information indicating the current state of corresponding battery pack 10 paired with said mobile terminal device 30. For example, the state of health (SOH) of battery pack 10 can be obtained. When the SOH of battery pack 10 falls below a predetermined value, battery pack management system 3 can send an e-mail prompting the owner or the manager to replace battery pack 10 with a new one.

Furthermore, battery pack management system 3 can also obtain current position information of battery pack 10 via mobile terminal device 30. As the current position information of battery pack 10, global positioning system (GPS) information of mobile terminal device 30 paired with battery pack 10 can be used. In the case of a rental service, a sharing service, or the like, battery pack management system 3 can send, to mobile terminal device 30 of a user who is currently using an electric assisted bicycle, a notification indicating where the electric assisted bicycle is to be returned.

When a typical Class 2 device is used, the BLE radio wave arrival range is approximately 10 m. Therefore, a plurality of vehicles 20a, 20b and a plurality of battery packs 10a, 10b may be present in one BLE communication range. In this case, there may be radio wave interference between vehicles systems, making the operation unstable. Vehicle 20 may be erroneously connected to battery pack 10 that is not attached thereto, but is located adjacent thereto; in this case, there is a possibility that battery pack 10 that is not attached to vehicle 20 will be erroneously controlled.

To address this, it is necessary to provide a system that ensures that battery pack 10 attached to vehicle 20 and battery pack 10 communicating with vehicle 20 are the same. In the present exemplary embodiment, using the identification information (ID), it is verified that battery pack 10 physically connected to vehicle 20 via wired communication and battery pack 10 connected to vehicle 20 via wireless communication are the same. This identification information (ID) may be identification information unique to each battery pack 10 or may be temporary identification information. As the unique identification information, a Bluetooth device (BD) address or a medium access control (MAC) address may be used, for example.

Figure 2:
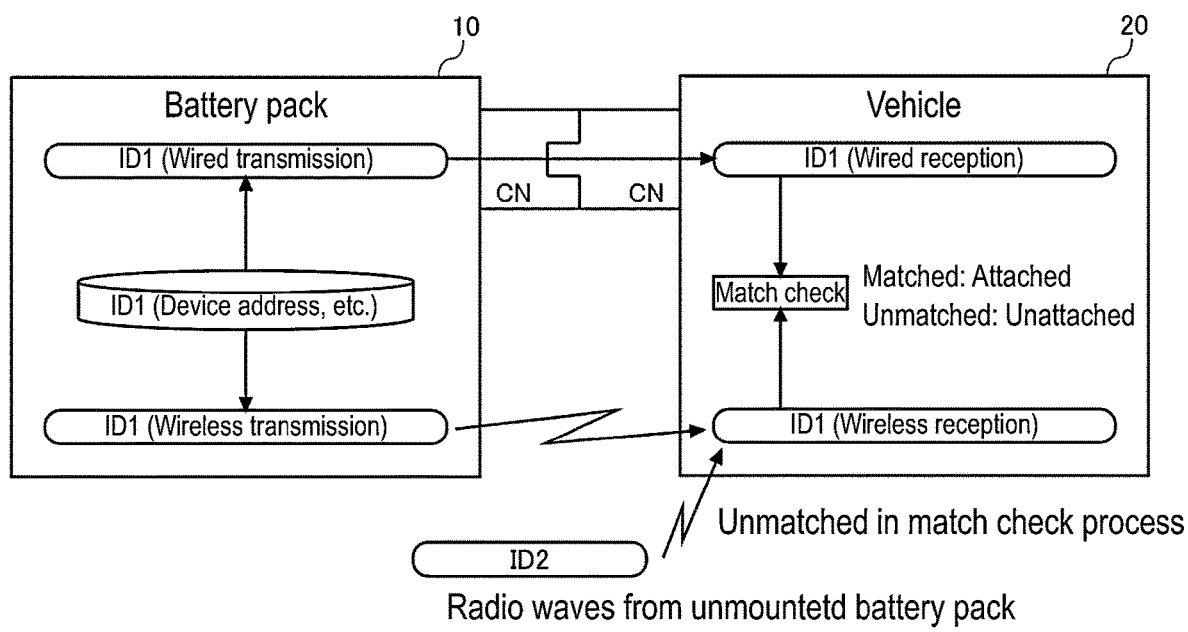
FIG. 2 is a diagram for describing the outline of a process of verifying a battery pack attached to a vehicle.

FIG. 2 is a diagram for describing the outline of the process of verifying battery pack 10 attached to vehicle 20. When the connector of battery pack 10 and the connector of the mounting slot of vehicle 20 are connected, battery pack 10 transmits ID 1 via the wired communication. At the same time, battery pack 10 sends an advertising packet (beacon packet) including ID 1 via the short-range wireless communication. The advertising packet is a signal for notifying nearby devices of the presence of battery pack 10 via the short-range wireless communication.

When receiving the advertising packet, vehicle 20 checks ID 1 included in the advertising packet against ID 1 received via the wired communication. When there is a match between these, vehicle 20 verifies that battery pack 10 attached thereto and the entity communicating therewith via the short-range wireless communication are the same. When there is no match between these, vehicle 20 determines that battery pack 10 attached thereto and the entity communicating therewith via the short-range wireless communication are not the same, and does not verify battery pack 10 communicating therewith. For example, when an advertising packet including ID 2 is received, battery pack 10 that is a delivery from which the advertising packet including ID 2 has been transmitted is not verified because ID 2 does not match ID 1 received via the wired communication.

In BLE, an encryption key for encrypting data is exchanged between a central device and a peripheral device. In BLE, the process of exchanging the encryption key is called a pairing process. Examples of the main pairing method in BLE include Passkey Entry and Just Works. Passkey Entry is a method in which a 6-digit verification code (also called passkey, passcode, PIN code, PIN number, password, verification number, or the like) is displayed on one of the central device and the peripheral device, the displayed verification code is input to the other, and thus whether the device is a correct device to be paired with is verified. In Passkey Entry, the encryption key to be exchanged has confidentiality and there is protection from a man-in-the-middle attack (MITM attack).

Just Works is a method in which pairing connection is permitted in an operation without verification or with a fixed verification code "000000". In Just Works, the encryption key to be exchanged has no confidentiality and there is no protection from a man-in-the-middle attack. Therefore, with Just Works, there is a risk that the system may be compromised and subject to unauthorized control, hacking, or the like.

In the present exemplary embodiment, a pairing method in which an encryption key to be exchanged has confidentiality, such as Passkey Entry, is used. Commonly used battery pack 10 does not include a display capable of displaying a verification code. Therefore, it is necessary to provide a system that allows battery pack 10 to notify a user of mobile terminal device 30 of a verification code in another way.

Figure 3:
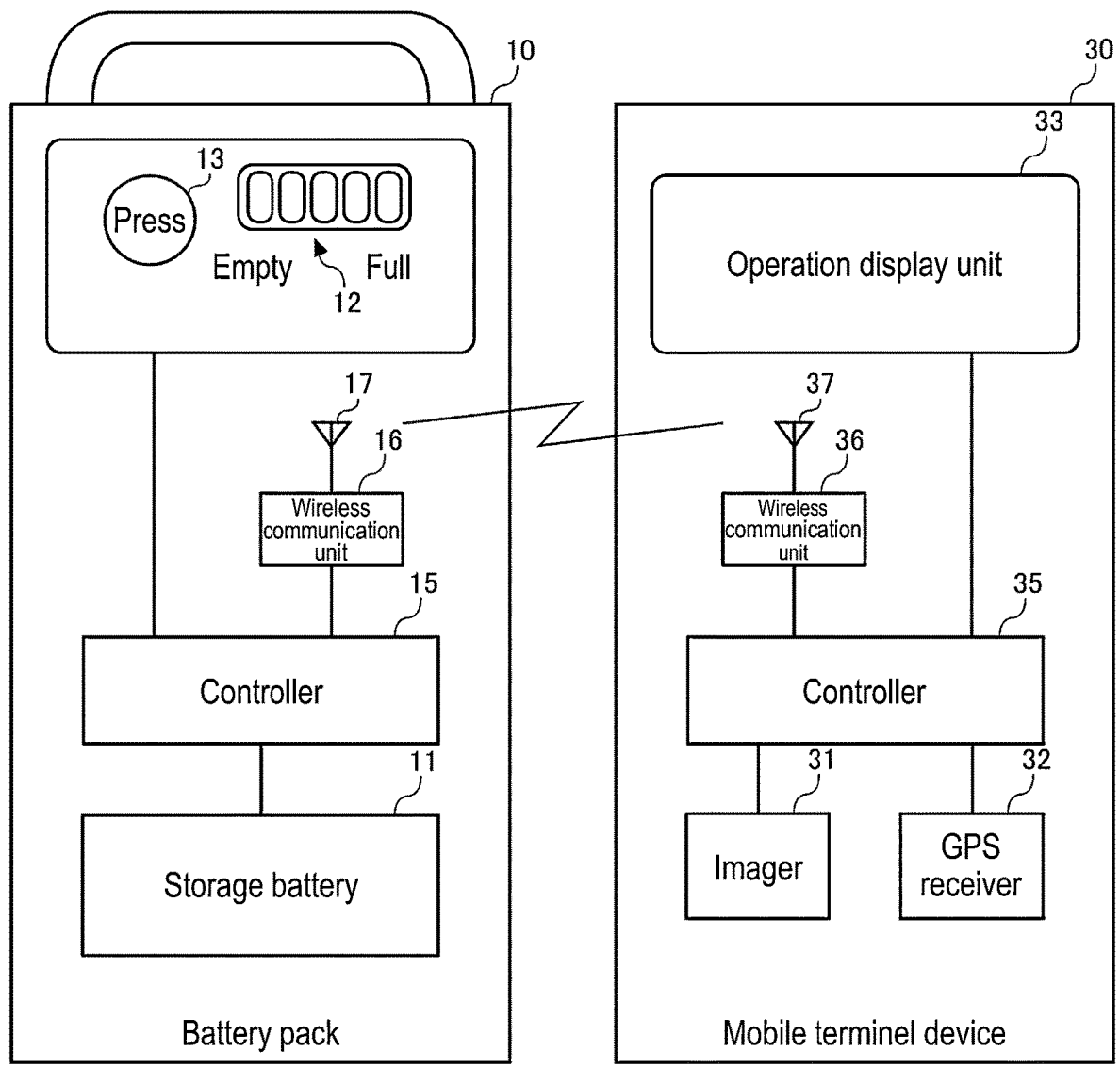
FIG. 3 is a diagram illustrating example configurations of a battery pack and a mobile terminal device according to an exemplary embodiment.

FIG. 3 is a diagram illustrating example configurations of battery pack 10 and mobile terminal device 30 according to an exemplary embodiment. Battery pack 10 includes storage battery 11, display 12, operation button 13, first controller 15, first wireless communication unit 16, and first antenna 17.

Storage battery 11 includes a plurality of cells connected in series or series/parallel. As the cells, lithium-ion battery cells, nickel-hydrogen battery cells, lead battery cells, or the like can be used. The following example herein assumes that lithium-ion battery cells (with a nominal voltage of 3.6 V to 3.7 V) are used. The number of cells connected in series is determined according to a drive voltage for a motor of vehicle 20.

Display 12 and operation button 13 constitute a user interface unit of battery pack 10. Display 12 is for displaying the remaining capacity of storage battery 11. Display 12 includes a plurality of light-emitting diode (LED) lamps among which the number of LED lamps to be turned ON varies according to the remaining capacity of storage battery 11. A user can press operation button 13 to cause display 12 to display an indicator indicating the remaining capacity of storage battery 11.

In the example illustrated in FIG. 3, display 12 includes five LED lamps. The remaining capacity of storage battery 11 is indicated by the number of LED lamps that are ON among the five LED lamps; for example, when five LED lamps are ON, the remaining capacity is 100% to 80%, when four LED lamps are ON, the remaining capacity is 80% to 60%, when three LED lamps are ON, the remaining capacity is 60% to 40%, when two LED lamps are ON, the remaining capacity is 40% to 20%, and when one LED lamp is ON, the remaining capacity is 10% to 0%. Note that a designer can freely select the number of lamps, the light source of display 12, and the like.

First controller 15 is a microcontroller that controls entire battery pack 10. First controller 15 monitors the state of storage battery 11 (specifically, the voltage, the electric current, and the temperature at each cell included in storage battery 11). On the basis of the monitoring data, first controller 15 estimates the state of charge (SOC), the full charge capacity (FCC), and the SOH of each cell included in storage battery 11. Furthermore, when an overvoltage, an undervoltage, an overcurrent, a high-temperature anomaly, or a low-temperature anomaly occurs in a cell included in storage battery 11, first controller 15 turns off a switch (not illustrated in the drawings) of a power line to protect the cell.

First wireless communication unit 16 performs a short-range wireless communication process. In the present exemplary embodiment, first wireless communication unit 16 is a BLE module, and first antenna 17 is a pattern antenna or a chip antenna embedded in the BLE module. First wireless communication unit 16 outputs, to first controller 15, data received via the short-range wireless communication, and transmits, via the short-range wireless communication, data that is input from first controller 15.

Mobile terminal device 30 includes imager 31, GPS receiver 32, operation display unit 33, second controller 35, second wireless communication unit 36, and second antenna 37. Imager 31 is a camera unit capable of capturing still and moving images. Imager 31 includes a lens, a solid-state imaging device, and a signal processing circuit. As the solid-state imaging device, a complementary metal oxide semiconductor (CMOS) image sensor or a charge coupled device (CCD) image sensor can be used, for example. The solid-state imaging device converts, into electric video signals, light that has entered the solid-state imaging device through the lens, and outputs the electric video signals to the signal processing circuit. The signal processing circuit performs signal processing such as A/D conversion and noise removal on the video signals that are input from the solid-state imaging device, and outputs the video signals to second controller 35.

GPS receiver 32 detects position information of mobile terminal device 30. GPS receiver 32 receives, from a plurality of GPS satellites, radio waves including transmission points in time, and calculates the latitude and longitude of a point of reception on the basis of a plurality of transmission points in time that are included in a plurality of radio waves received. GPS receiver 32 outputs the calculated latitude and longitude of the point of reception to second controller 35 as the position information of mobile terminal device 30.

Operation display unit 33 includes a touch-panel display. As the touch-panel display, a liquid-crystal display, an organic electroluminescent (EL) display, a mini-LED display, or the like can be used. Note that operation display unit 33 may further include a physical key. Furthermore, operation display unit 33 may be configured as a combination of a physical key and a display including no touch-panel functions.

Second controller 35 is a controller that controls entire mobile terminal device 30. Second controller 35 can be implemented by the coordination of a hardware resource and a software resource or can be implemented by a hardware resource only. As the hardware resource, a central processing unit (CPU), read-only memory (ROM), random-access memory (RAM), a graphics processing unit (GPU), a digital signal processor (DSP), an image signal processor (ISP), an application specific integrated circuit (ASIC), a field programmable gate array (FPGA), a system on a chip (SoC), and other LSIs can be used. As the software resource, an operating system, middleware, and a program such as an application can be used.

Second wireless communication unit 36 includes one or more communication modules corresponding to a plurality of communication methods (for example, BLUETOOTH wireless technology, Wi-Fi, 4G, and 5G). For example, BLUETOOTH wireless technology and Wi-Fi may be integrated into one communication module. Second antenna 37 corresponding to each communication method may be embedded in a corresponding communication module or may be an external antenna.

In the present exemplary embodiment, before using vehicle 20, a user needs to download an application program for managing battery pack 10 (hereinafter referred to as a pack management app) from a distribution server onto mobile terminal device 30 and install the pack management app on mobile terminal device 30. The pack management app has been uploaded to the distribution server in advance, and the distribution server provides the pack management app under management to mobile terminal device 30 that has accessed the distribution server via network 2. Alternatively, mobile terminal device 30 may be configured to directly access a website managed by battery pack management system 3 and download the pack management app.

Figure 4:
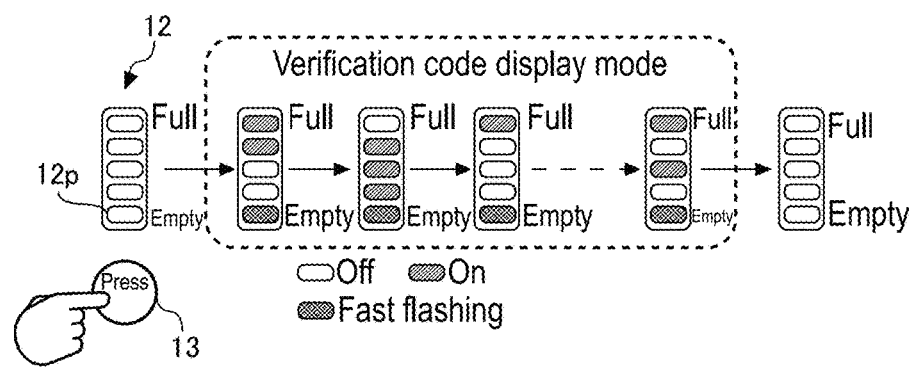
FIG. 4 is a diagram for describing a pairing process for a battery pack and a mobile terminal device according to an exemplary embodiment.

FIG. 4 is a diagram for describing the pairing process for battery pack 10 and mobile terminal device 30 according to the exemplary embodiment. When a user presses and holds operation button 13 of battery pack 10, first controller 15 of battery pack 10 switches display 12 to a verification code display mode. The user starts the pack management app on mobile terminal device 30 and starts the process of capturing moving images of display 12 of battery pack 10 as a subject using imager 31.

First controller 15 generates a verification code to be used in the pairing process, and causes the ON OFF state of each of the plurality of LED lamps included in display 12 to transition on the basis of the verification generated. At this time, first controller 15 sets one specific LED lamp 12p among the plurality of LED lamps as a position guide. In the example illustrated in FIG. 4, among five LED lamps arranged vertically, LED lamp 12p located at the bottom (that is on the far left in the arrangement in battery pack 10 illustrated in FIG. 3) is set as the position guide.

Four LED lamps other than LED lamp 12p which is to be used as the position guide are LED lamps for notification; the four LED lamps can indicate four-bit information. In the example illustrated in FIG. 4, the LED lamp next to the LED lamp to be used as the position guide is set to a LED lamp indicating the most significant bit, and the LED lamp located at the top (or on the far right) is set to a LED lamp indicating the least significant bit. During a period in which the verification code display mode is ON, first controller 15 causes one LED lamp 12p set as the position guide to flash fast.

In mobile terminal device 30, second controller 35 that runs the pack management app locates the position guide that is flashing fast in each frame image that is input from imager 31. The pack management app includes a discriminator for display 12 of battery pack 10 that is generated by learning a large number of images of display 12 of battery pack 10. Using the discriminator for display 12, second controller 35 searches each frame image for display 12. At this time, while rotating or zooming in or out a predetermined region including the position guide, second controller 35 inputs features of the predetermined region to the discriminator, and spots display 12 in the frame image. On the basis of the image of display 12 recognized in each frame image, second controller 35 specifies the ON OFF state of each of the plurality of LED lamps included in display 12.

Figure 5:
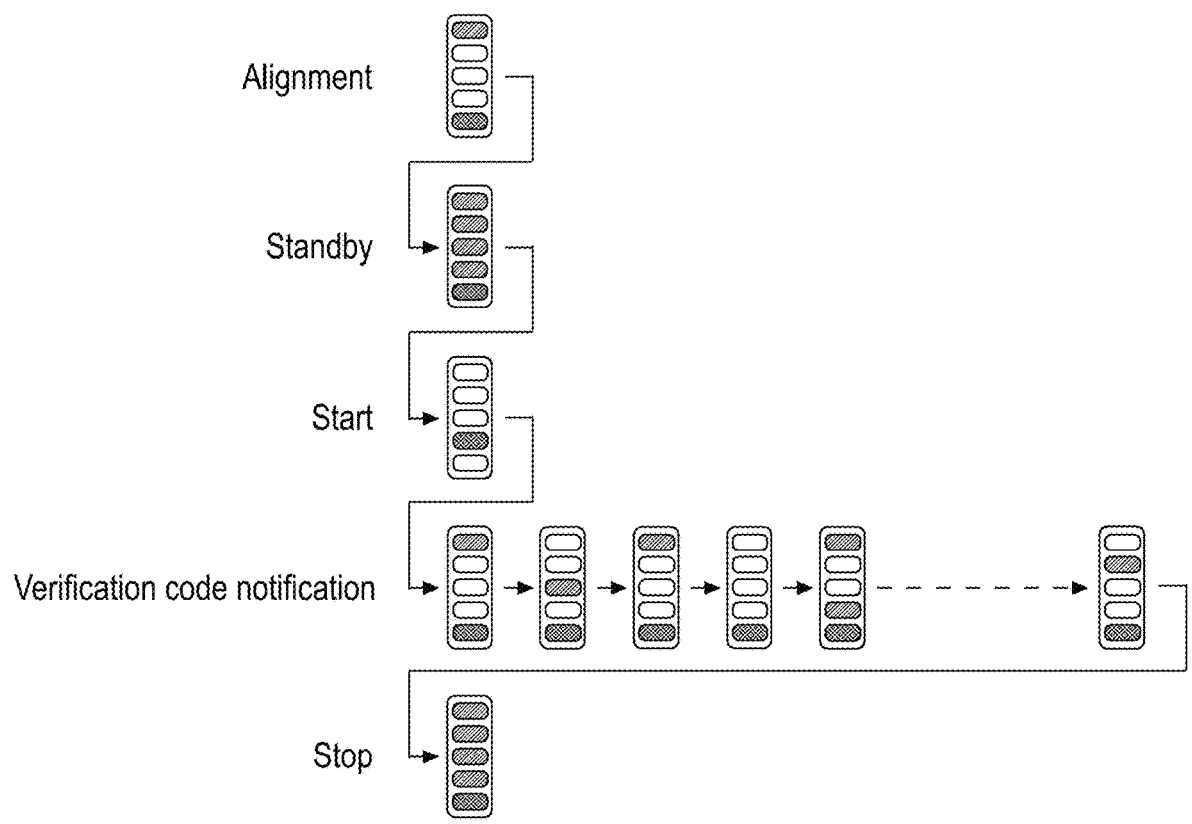
FIG. 5 is a diagram for describing a first working example of a verification code notification via a display.

FIG. 5 is a diagram for describing a first working example of a verification code notification via display 12. When the verification code display mode is turned ON, first, first controller 15 causes LED lamp 12p as the position guide to flash fast for a predetermined length of time as a period for alignment of imager 31 of mobile terminal device 30, and turns ON one of the four LED lamps for notification (the LED lamp located at the top in FIG. 5).

When the predetermined length of time for alignment has elapsed, first controller 15 turns ON all the four LED lamps for notification in order to notify mobile terminal device 30 of having entered into a standby state. As a sign of the start of verification code notification, first controller 15 turns OFF all the four LED lamps for notification. The start of the verification code notification may be triggered by the fact that the predetermined length of time has elapsed since the transition to the standby state or may be triggered by the fact that a user has pressed operation button 13 in the standby state.

First controller 15 causes the ON OFF state of the four LED lamps for notification to transition according to the verification code to be presented. In one ON OFF state, four-bit data can be indicated. The four-bit data can represent a number from 0 to 15 in decimal notation and a number from 0 to F in hexadecimal notation. Therefore, when a 6-digit verification code in decimal or hexadecimal notation is used, it is possible to present the verification code by switching the ON OFF state of the four LED lamps for notification six times.

Note that two ON OFF states of the four LED lamps for notification may be used as four 7-segment displays. In this case, a 4-digit number in decimal notation can be indicated by two ON OFF states. Therefore, when a 6-digit verification code in decimal notation is used, it is possible to present the verification code by switching the ON OFF state of the four LED lamps for notification four times.

As a sign of the end of the verification code notification, first controller 15 turns ON all the four LED lamps for notification. When the verification code notification ends, first controller 15 ends the verification code display mode of display 12. Note that the manufacturer of battery pack 10 has registered the sign of each of the standby state, the start of the verification code notification, and the end of the verification code notification into the pack management app in advance.

Second controller 35 of mobile terminal device 30 performs image recognition on the plurality of frame images included in the moving images captured by imager 31, and detects the verification code presented by display 12 of battery pack 10. Second controller 35 causes operation display unit 33 to display the verification code detected. A user operates operation display unit 33 to accept the verification code displayed.

First controller 15 of battery pack 10 causes display 12 to display the verification code and causes first wireless communication unit 16 to send an advertising packet including the pack ID of battery pack 10 itself. When second wireless communication unit 36 receives the advertising packet, second controller 35 of mobile terminal device 30 transmits, using second wireless communication unit 36, a pairing request to a delivery from which the advertising packet has been transmitted.

When first wireless communication unit 16 receives the pairing request, first controller 15 of battery pack 10 accepts the pairing request unless the pairing request has been transmitted from an unsupported device. Using first wireless communication unit 16, first controller 15 returns a pairing response indicating acceptance of the pairing request to a pairing request source.

When second wireless communication unit 36 receives the pairing response indicating the acceptance of the pairing request, second controller 35 of mobile terminal device 30 transmits a pairing confirmation including the detected verification code to a pairing request destination. When first wireless communication unit 16 receives the pairing confirmation including the verification code, first controller 15 of battery pack 10 checks the verification code included in the received pairing confirmation against the verification code displayed on display 12. When these match, first controller 15 returns a pairing confirmation indicating a verification success to the pairing request source.

When second wireless communication unit 36 receives the pairing confirmation indicating the verification success, second controller 35 of mobile terminal device 30 generates a short term key (STK) using the verification code detected. Second controller 35 transmits security information including the generated short term key to the pairing request destination. When first wireless communication unit 16 receives the security information including the short term key, first controller 15 of battery pack 10 returns a security information receipt confirmation to the pairing request source.

First controller 15 of battery pack 10 generates a long term key (LTK) for encrypting data to be exchanged via BLE, and performs a bonding process. First controller 15 encrypts the generated long term key using the short term key received from the pairing request source. First controller 15 transmits, to the pairing request source, security information including the long term key encrypted using the short term key.

When second wireless communication unit 36 receives the security information including the long term key, second controller 35 of mobile terminal device 30 decrypts the received, encrypted long term key using the short term key being held by second controller 35 itself, and performs a bonding process using the long term key decrypted.

Through these procedures, the long term key to be used for BLE communication is exchanged between battery pack 10 and mobile terminal device 30. Note that when first wireless communication unit 16 and second wireless communication unit 36 include microcontrollers, the generation and exchange of the short term key, the generation and exchange of the long term key, and the bonding process using the long term key may be performed in first wireless communication unit 16 and second wireless communication unit 36.

Figure 6A:
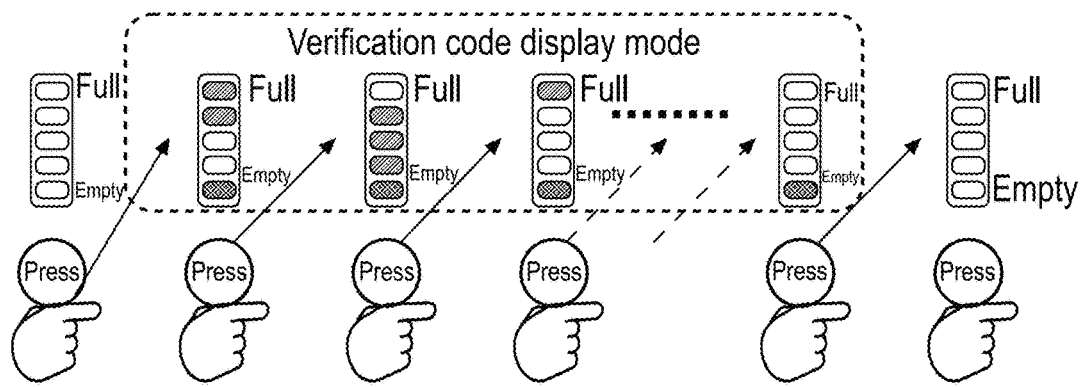
FIG. 6A is a diagram for describing a second working example of a verification code notification via a display.
Figure 6B:
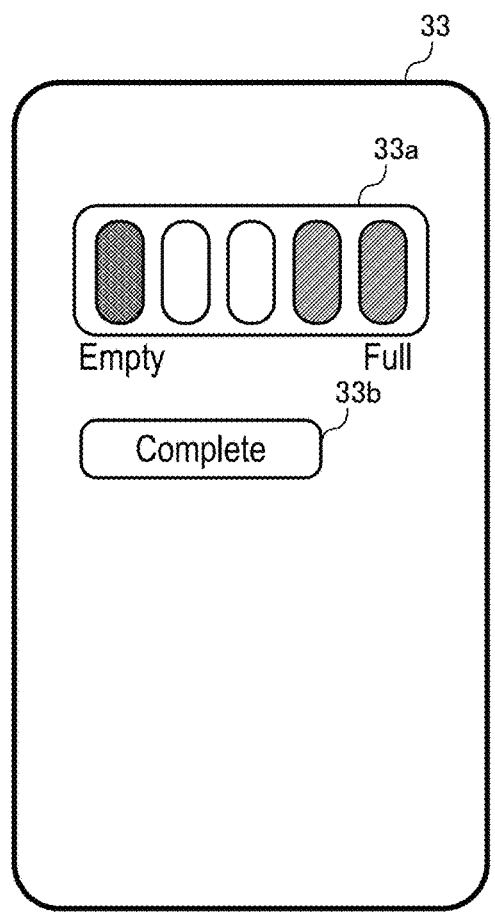
FIG. 6B is a diagram for describing a second working example of a verification code notification via a display.

FIG. 6A and FIG. 6B are diagrams for describing a second working example of the verification code notification via display 12. In the second working example, the ON OFF state of display 12 is visually checked by a user without using the moving image capture function of mobile terminal device 30. Similar to the first working example, when a user presses and holds operation button 13 of battery pack 10, first controller 15 of battery pack 10 switches display 12 to the verification code display mode.

The user starts the pack management app on mobile terminal device 30. When the pack management app is started, verification code enter key 33a and complete key 33b are displayed on operation display unit 33 of mobile terminal device 30, as illustrated in FIG. 6B.

As illustrated in FIG. 6A, in the verification code display mode, every time a user presses operation button 13 of battery pack 10, the ON OFF state of the plurality of LED lamps included in display 12 is switched. The user visually checks the ON OFF state of the plurality of LED lamps and operates verification code enter key 33a of operation display unit 33. Each key of verification code enter key 33a is switched from ON to OFF or from OFF to ON every time a user taps the key. When a user presses complete key 33b, second controller 35 reads information indicated by one ON OFF state. By repeating these procedures, a verification code with multiple digits is conveyed from battery pack 10 to mobile terminal device 30. The flow of the pairing process using the verification code is substantially the same as that described in the first working example.

As described above, according to the present exemplary embodiment, the security of the pairing process for battery pack 10 and mobile terminal device 30 can be improved at low cost. Since there is no need to additionally provide a display on battery pack 10 and it is sufficient that existing display 12 for displaying the remaining capacity of storage battery 11 be used, an increase in the cost of battery pack 10 can be reduced. Mobile terminal device 30 only needs to install the pack management app; there is no addition of hardware.

When a barcode sticker, a QR code sticker, or the like is attached to battery pack 10, the value of the verification code cannot be changed unless the sticker is replaced with a new one. Furthermore, the information of the verification code is basically exposed to the outside. Regarding this issue, in the present exemplary embodiment, a new verification code can be generated every time the verification code is issued. Moreover, the verification code is displayed on display 12 only at the time of notification of the verification code. Therefore, it is possible to significantly increase the level of security as compared to the case where a barcode sticker, a QR code sticker, or the like is attached to battery pack 10.

In the first working example, a user only needs to use imager 31 of mobile terminal device 30 to capture moving images of a flashing LED lamp so that mobile terminal device 30 can retrieve the verification code, and thus the operation becomes less cumbersome. Furthermore, human errors in data entry can be eliminated, and the likelihood of successful pairing can improve. Moreover, the verification code can be obtained in a short time. In addition, even when the number of digits of the verification increases, the operational burden on users does not increase.

In the second working example, even mobile terminal device 30 with no cameras can obtain the verification code. Furthermore, there is no need for image capture position adjustment; even a user who is not familiar with the camera of mobile terminal device 30 can easily cause mobile terminal device 30 to retrieve the verification code.

The present disclosure has been described thus far based on the exemplary embodiment. The exemplary embodiment is merely an example; a person having ordinary skill in the art will readily appreciate that various variations are possible as a combination of these structural elements and these processes and that these variations are also included in the scope of the present disclosure.

In the above-described exemplary embodiment, among the plurality of LED lamps included in display 12, specific one LED lamp 12p is set as the position guide. In this regard, the position guide may be marked with paint, a sticker, or the like near the plurality of LED lamps included in display 12.

In this case, all the LED lamps included in display 12 can be used as LED lamps for data notification. Note that in the case of the second working example, the position guide itself may be omitted.

In the second working example described above, a user inputs the ON OFF state of each of the plurality of LED lamps to verification code enter key 33a of operation display unit 33 every time it is needed. In this regard, a user may use imager 31 to capture a still image of the plurality of LED lamps in the ON OFF state. Still images typically have a higher image quality than moving images; thus, when a still image is captured, the accuracy of detecting the plurality of LED lamps in the image improves.

In the above exemplary embodiment, the ON OFF state of each of the plurality of LED lamps on display 12 transitions according to the verification code, and thus a user of mobile terminal device 30 is notified of the verification code. In this regard, the verification code notification is not limited to a method in which visible information is used. Sound information can be used to notify a user of mobile terminal device 30 of the verification code.

For example, a loudspeaker may be mounted on battery pack 10 so that when operation button 13 is pressed and held, first controller 15 of battery pack 10 causes said loudspeaker to output speech indicating the verification code. A user enters, on operation display unit 33 of mobile terminal device 30, the verification code that has been heard. Furthermore, when operation button 13 is pressed and held, first controller 15 of battery pack 10 causes said loudspeaker to output speech or audio in which the verification code is embedded as a digital watermark. A user uses a microphone (not illustrated in the drawings) of mobile terminal device 30 to record said speech or audio. The digital watermark of the verification code embedded is detected using an audio analysis function of the pack management app. In this manner, mobile terminal device 30 can also obtain the verification code from battery pack 10 as sound information.

The above exemplary embodiment has described an example in which battery pack 10 incorporating storage battery 11 is used. In this regard, a capacitor pack incorporating a capacitor that includes an electric double layer capacitor cell, a lithium ion capacitor cell, or the like may be used. The battery pack and the capacitor pack are collectively referred herein to as a power storage pack.

The above exemplary embodiment assumes that vehicle 20 to which the power storage pack is attached is an electric assisted bicycle. In this regard, vehicle 20 is not limited to the electric assisted bicycle; examples of vehicle 20 include an electric motorcycle (an electric scooter), an electric kick scooter, an electric vehicle (including a low-speed electric vehicle such as a golf cart or a land car), and a railroad car. Furthermore, an object to which the power storage pack is attached is not limited to vehicle 20; examples of said object include an electric mobile body such as an electric boat or ship or a multirotor (a drone).

Note that the exemplary embodiment may be specified according to the following items.

[Item 1] A power storage pack (10) including:
 a power storage unit (11) configured to supply electric power to an electric mobile body (20);
 a wireless communication unit (16) configured to perform short-range wireless communication; and
 a notification unit (12) that presents, to a user of a mobile terminal device (30), a tentative notification of a verification code that is to be used in a process of exchanging an encryption key that is to be used for the short-range wireless communication with the mobile terminal device (30).

With this, by using the verification code for notification that is only tentative, it is possible to improve the security of the pairing process for the power storage pack (10) and the mobile terminal device (30).

[Item 2] The power storage pack (10) according to item 1, wherein
 the notification unit (12) includes a remaining capacity display (12) for the power storage unit (11).

With this, the security of the pairing process for the power storage pack (10) and the mobile terminal device (30) can be improved at low cost.

[Item 3] The power storage pack (10) according to item 2, further including:
 an operation unit (13) configured to cause the remaining capacity display (12) to display a remaining capacity of the power storage unit (11); and
 a controller (15) that manages the remaining capacity of the power storage unit (11), wherein the remaining capacity display (12) includes a plurality of lamps (12) among which a total number of lamps to be turned ON varies according to the remaining capacity of the power storage unit (11),
 when the controller (15) recognizes a first operation performed on the operation unit (13), the controller (15) causes, among the plurality of lamps (12), a corresponding number of lamps (12) for the remaining capacity of the power storage unit (11) to be turned ON, and when the controller (15) recognizes a second operation performed on the operation unit (13), the controller (15) causes an ON OFF state of each of the plurality of lamps (12) to transition according to the verification code.

With this, by way of the ON OFF state in the remaining capacity display (12), it is possible to notify a user of the verification code.

[Item 4] The power storage pack (10) according to item 3, wherein
 in presenting the tentative notification of the verification code by way of the ON OFF state of each of the plurality of lamps (12), the controller (15) sets one specific lamp (12p) as a position guide.

This facilitates image recognition of images of the plurality of lamps (12) captured by the mobile terminal device (30).

[Item 5] A mobile terminal device (30) including:
 a wireless communication unit (36) configured to perform short-range wireless communication;
 an obtainment unit (31) that obtains a verification code from the power storage pack (10) according to one of items 1 to 4, as triggered by an operation performed by a user; and
 a controller (35) that performs a process of exchanging, with the power storage pack (10) using the verification code, an encryption key that is to be used for the short-range wireless communication with the power storage pack (10).

With this, the security of the pairing process for the power storage pack (10) and the mobile terminal device (30) can be improved.

[Item 6] The mobile terminal device (30) according to item 5, wherein
 the obtainment unit (31) includes an imager (31),
 as triggered by an operation performed by the user, the imager (31) captures moving images of the plurality of lamps (12) of the power storage pack (10) according to item 3 or 4, the plurality of lamps (12) being in an ON OFF state, and the controller (15) performs image recognition of a plurality of frame images included in the moving images captured by the imager (31), detects the verification code, and performs the process of exchanging the encryption key using the verification code detected.

With this, the user operation of entering the verification code can be made less cumbersome.

[Item 7] The mobile terminal device (30) according to item 6, wherein as triggered by the operation performed by the user, the imager (31) captures the moving images of the plurality of lamps (12) of the power storage pack (10) according to item 4, the plurality of lamps (12) being in the ON OFF state, and the controller (15) recognizes, as a lamp (12p) for a position guide, one specific lamp (12p) that is flashing.

With this, the image recognition of the plurality of lamps (12) is made easier.

[Item 8] A wireless communication program that causes a computer to execute the processes of:

obtaining a verification code from the power storage pack (10) according to one of items 1 to 4, as triggered by an operation performed by a user; and performing a process of exchanging, with the power storage pack using the verification code, an encryption key that is to be used for short-range wireless communication with the power storage pack.

With this, the security of the pairing process for the power storage pack (10) and the mobile terminal device (30) can be improved.

REFERENCE SIGNS LIST 2 network
3 battery pack management system
10 battery pack
20 vehicle
30 mobile terminal device
11 storage battery
12 display
13 operation button
15 first controller
16 first wireless communication unit
17 first antenna
31 imager
32 GPS receiver
33 operation display unit
33a verification code enter key
33b complete key
35 second controller
36 second wireless communication unit
37 second antenna

The invention claimed is:

1. A power storage pack comprising:
a storage battery configured to supply electric power to an electric mobile body;
a short-range wireless communication module configured to perform short-range wireless communication;
a display that temporarily notifies, to a user of a mobile terminal device, a verification code that is to be used in a process of exchanging an encryption key that is to be used for the short-range wireless communication with the mobile terminal device;

an operation button configured to cause a remaining capacity display to display a remaining capacity of the storage battery; and a controller that manages the remaining capacity of the storage battery, wherein the display includes the remaining capacity display for the storage battery, the remaining capacity display includes a plurality of lamps among which a total number of lamps to be turned ON varies according to the remaining capacity of the storage battery, when the controller recognizes a first operation performed on the operation button, the controller causes the display to turn ON, among the plurality of lamps, a corresponding number of lamps for the remaining capacity of the storage battery, when the controller recognizes a second operation performed on the operation button, the controller causes the display to transition an ON OFF state of the plurality of lamps according to the verification code, and when the display notifies the verification code by way of the ON OFF state of the plurality of lamps, the controller sets one specific lamp as a position guide.

2. The mobile terminal device comprising:
a short-range wireless communication module configured to perform short-range wireless communication;
an imager that obtains a verification code from the power storage pack according to claim 1, as triggered by an operation performed by a user; and
a controller that performs a process of exchanging, with the power storage pack using the verification code, an encryption key that is to be used for the short-range wireless communication with the power storage pack, wherein as triggered by the operation performed by the user, the imager captures moving images of the plurality of lamps of the power storage pack according to claim 1, the plurality of lamps being in the ON OFF state, and the controller of the mobile terminal device performs image recognition of a plurality of frame images included in the moving images captured by the imager, detects the verification code, and performs the process of exchanging the encryption key using the verification code detected, when the display notifies the verification code by way of the ON OFF state of the plurality of lamps, the controller of the power storage pack according to claim 1, sets one specific lamp as a position guide, as triggered by the operation performed by the user, the imager captures the moving images of the plurality of lamps of the power storage pack, the plurality of lamps being in the ON OFF state, and the controller of the mobile terminal device recognizes, as a lamp for a position guide, one specific lamp that is flashing.

3. A non-transitory machine-readable recording medium that stores a wireless communication program that causes a computer to execute:

performing a short-range wireless communication;
obtaining a verification code from the power storage pack according to claim 1, as triggered by an operation performed by a user; and
performing a process of exchanging, with the power storage pack using the verification code, an encryption key that is to be used for the short-range wireless communication with the power storage pack, wherein as triggered by the operation performed by the user, capturing moving images of the plurality of lamps of the power storage pack according to claim 1, the plurality of lamps being in the ON OFF state, and performing image recognition of a plurality of frame images included in the captured moving images, detecting the verification code, and performing the process of exchanging the encryption key using the verification code detected, when the verification code is notified by way of the ON OFF state of the plurality of lamps, setting one specific lamp as a position guide, as triggered by the operation performed by the user, capturing the moving images of the plurality of lamps of the power storage pack, the plurality of lamps being in the ON OFF state, and recognizing, as a lamp for a position guide, one specific lamp that is flashing.

\* \* \* \* \*